(12) United States Patent
McDaniel et al.

(10) Patent No.: US 7,296,370 B2
(45) Date of Patent: *Nov. 20, 2007

(54) ELECTROPLATED METALS WITH SILVERY-WHITE APPEARANCE AND METHOD OF MAKING

(75) Inventors: Paul McDaniel, Jonesborough, TN (US); Johnny Smelcer, Midway, TN (US); Randy Beets, Bull Gap, TN (US)

(73) Assignee: Jarden Zinc Products, Inc., Greeneville, TN (US)

( * ) Notice: Subject to any disclaimer, the term of this patent is extended or adjusted under 35 U.S.C. 154(b) by 46 days.

This patent is subject to a terminal disclaimer.

(21) Appl. No.: 10/950,242

(22) Filed: Sep. 24, 2004

(65) Prior Publication Data

US 2006/0068219 A1   Mar. 30, 2006

(51) Int. Cl.
*B32B 15/00* (2006.01)
*B32B 15/20* (2006.01)
*A44C 21/00* (2006.01)

(52) U.S. Cl. .................. 40/27.5; 428/647; 428/675

(58) Field of Classification Search ............... None
See application file for complete search history.

(56) References Cited

U.S. PATENT DOCUMENTS

| | | | |
|---|---|---|---|
| 2,511,395 A * | 6/1950 | Baier et al. ............ 205/96 |
| 2,658,032 A * | 11/1953 | Faust et al. ........... 205/265 |
| 3,940,254 A | 2/1976 | McMullen et al. |
| 4,401,488 A | 8/1983 | Prinz et al. |
| 4,550,819 A | 11/1985 | Smith |
| 4,565,608 A * | 1/1986 | Hoffacker et al. ...... 205/241 |
| 4,579,761 A | 4/1986 | Ruscoe et al. |
| 4,644,674 A | 2/1987 | Burrows et al. |
| 4,810,591 A | 3/1989 | Sakai |
| 5,139,886 A | 8/1992 | Truong et al. |
| 5,151,167 A | 9/1992 | Truong et al. |
| 5,614,327 A * | 3/1997 | Morello .............. 428/632 |
| 5,972,526 A * | 10/1999 | Matsumoto et al. ..... 428/644 |

(Continued)

FOREIGN PATENT DOCUMENTS

EP    0450883 A2 *  3/1991

(Continued)

*Primary Examiner*—John J. Zimmerman
(74) *Attorney, Agent, or Firm*—Lawrence J. Shurupoff

(57) ABSTRACT

Metals having a silvery-white appearance and methods of producing the same. In one embodiment, the composite material of the present invention comprises a metallic core, a first layer, and a second layer. The first layer encases the external surfaces of the metallic core and is produced by electroplating copper or copper alloy from a first bath containing copper ions. The second layer encases the first layer and is produced by electroplating white bronze from a second bath containing copper and tin ions. According to one embodiment of the method of the present invention, the first layer is electroplated on the metallic core and the second layer is electroplated on the first layer. In another embodiment of the composite material and method of the present invention, the material comprises only the metallic core and a first layer of white bronze. The resulting composite has a silvery-white appearance and does not include exposed nickel so that persons allergic to nickel metals are not affected by the composite. The composite material may be configured by standard processing methods to finished products such as coins, tokens, and medallions.

8 Claims, 1 Drawing Sheet

U.S. PATENT DOCUMENTS

| | | |
|---|---|---|
| 6,383,657 B1 | 5/2002 | Weber |
| 6,416,571 B1 * | 7/2002 | Kaneko et al. .............. 106/1.18 |
| 6,432,556 B1 | 8/2002 | Brauer et al. |
| 6,656,606 B1 | 12/2003 | Morin et al. |
| 6,692,630 B2 | 2/2004 | Morin et al. |
| 2002/0104763 A1 * | 8/2002 | Yanada et al. ............... 205/241 |
| 2002/0166774 A1 * | 11/2002 | Schetty et al. .............. 205/252 |
| 2003/0059634 A1 * | 3/2003 | Naoi et al. .................. 428/472 |
| 2005/0263403 A1 * | 12/2005 | Zschintzsch et al. ........ 205/241 |
| 2006/0286400 A1 * | 12/2006 | McDaniel et al. .......... 428/689 |

FOREIGN PATENT DOCUMENTS

| | | | |
|---|---|---|---|
| JP | 10-102278 | * | 4/1998 |
| JP | 2004-010907 | * | 1/2004 |
| WO | WO 2004/035875 A2 | * | 4/2004 |

* cited by examiner

ELECTROPLATED METALS WITH SILVERY-WHITE APPEARANCE AND METHOD OF MAKING

BACKGROUND OF THE INVENTION

This invention relates to metals having a silvery-white appearance and method of making the same, and, in particular to such metals produced by electroplating processes.

Nickel is used for a variety of different coinage, tokens, and medallions. More specifically, coinage, tokens, and medallions are often made with cupronickel, nickel brass, and nickel-plated steel. Cupronickel is also known as copper alloy C713, and contains 23.5% to 26.5% nickel by weight, with the balance of the composition comprising copper. One characteristic of nickel is its silvery-white appearance which is recognizable in distinguishing the nickel-based coinage, tokens, and medallions from other coinage, tokens, and medallions.

Many people have an allergy to nickel metals. Allergic reactions to nickel are not only a problem for consumers handling nickel-based objects, but are particularly a problem for persons, such as cashiers and tellers, who handle lots of coins, and for persons involved in the manufacture of such objects. Thus, it is desired to provide coinage, tokens, and medallions that do not expose such persons to nickel metals when in contact with the coinage, tokens, or medallions. Yet, if it is desired to modify coins, tokens, or medallions to eliminate contact to nickel metals, it is still desired to retain the silvery-white appearance for recognition and distinguishing purposes. For example, it is desired that any replacement for the 5 cent coin in the United States, known as the "nickel", should have substantially the same appearance as the present-day "nickel".

Present technology used to produce silvery-white coins, tokens, and medallions include: (1) A corrosion-resistant white metal alloy (stainless steel, nickel alloy, cupronickel, etc.); (2) A clad material with a corrosion-resistant white metal alloy bonded to a base metal core; and (3) Electroplated nickel over a base metal core (usually steel), often with one or more plated layers beneath the nickel. On steel, a total minimum plating thickness of 25 µm is usually specified, due to corrosion concerns. After plating, nickel-plated blanks must be baked to relieve the stresses in the plating, which would otherwise lead to cracking during the coining process. The oxides formed during this baking process must be removed by burnishing the blanks. In all three processes, the finished blank is capable of inducing contact dermatitis in any individual who is sensitized to nickel, unless the surface alloy contains no nickel.

In addition to maintenance of appearance, there are several other characteristics and properties required of coinage, tokens, and medallions. Over long usage, the coinage, token, or medallion must maintain its color, and be tarnish-resistant, durable, and attractive. The coinage, token, or medallion must stand up to the wear and tear of its intended usage and handling. Weight of the coinage, token or medallion is also a concern, particularly when used in automatic machines. For example, vending machines accepting coinage are often weight sensitive, as are machines accepting subway tokens.

It is also desired that any coinage, token, or medallion that does not expose a handler to any nickel metal also be comprised of materials and made by processes that are near or less the cost of materials and manufacture of present coinage, tokens, and medallions. No change in appearance should result in the finished product, and, therefore, such coinage, tokens, and medallions need to be able to be converted from a blank to a finished product using standard production techniques. Stated another way, the object must be fabricable into the end product and have sufficient ductility to enable it to be struck or minted into the finished product.

It is further desired to develop coinage, tokens, and medallions that are comprised of inexpensive metals—at least in part. For coinage, in particular, it is generally desired that the cost of the metal(s) and production for a coin be low relative to the face value of the coin. The less expensive the coin is to produce, the greater seigniorage is gained by the minting process. Further, if the value of the metal(s) of the coin exceeds the face value, the issuing entity will likely be forced to change the size or makeup of the coin to lower the value of the metal(s) in the coin so that the public will not sell the coins for the value of the metal(s). Consider, for example, the coin of U.S. Pat. No. 6,383,657 that has a silver appearance but does not utilize a silver core or silver cladding layers. Instead, aluminum and zinc are used to produce a coin having a silver appearance. Aluminum and zinc are both significantly less expensive materials than is silver.

Various efforts have been made in the past to make coinage, tokens, or medallions from alternate materials. For example, the invention of U.S. Pat. No. 5,151,167 comprises a coin including a blank electroplated with nickel, followed by an electroplated copper layer, and a final electroplated nickel layer. The invention of U.S. Pat. No. 5,151,167 does not require the use of nickel as the core of the coin, but, it results in a coin having nickel metals to which persons would be exposed. Thus, such a coin does not address the issue of nickel allergies. Also, the manufacture of the coin of U.S. Pat. No. 5,151,167 involves three electroplating processes to result in the "nickel" coin, and is therefore expensive to perform.

Several methods have been developed to produce coins having a golden color. For example, U.S. Pat. No. 4,579,761 describes production of coins having a gold appearance by using yellow bronze. The yellow bronze of U.S. Pat. No. 4,579,761 contains 8% to 16% by weight of tin, with the balance as copper. Similarly, U.S. Pat. No. 6,432,556 discloses production of a coin having a golden appearance. The coin includes two cladding layers. The first cladding layer contains 6% to 12% manganese and 6% to 25% zinc, while the second cladding layer contains 7% to 10% manganese and 10% to 15% zinc. U.S. Pat. No. 6,432,556 also suggests that the cladding layers might contain nickel, and could contain small traces of other metals, such as tin. These patents teach one skilled in the art to produce coins having a gold appearance—not a silvery-white appearance as results in the use of nickel.

SUMMARY

The present invention comprises metals having a silvery-white appearance, and methods of making the same. In one embodiment, a composite material of the present invention comprises a metallic core, a first layer adhered to and encasing the metallic core, and a second layer adhered to and encasing the first layer. The metallic core may comprise a plate of zinc, nickel, iron (steel), copper, aluminum, or any of their alloys. Of course, a metallic core of copper alloy includes those of brasses or bronzes. The first layer comprises copper or copper alloy and is created using an electroplating process from a first bath comprising copper ions. The second layer comprises white bronze alloy and is created using an electroplating process from a second bath comprising copper and tin ions. The resulting composite material has a silvery-white appearance, such as is the conventional appearance of nickel and its alloys. However, the composite material does not contain any nickel in the second layer, so that persons having an allergy to nickel will not be affected by such allergy when handling the composite material. Further, the resulting product will maintain its color, and is tarnish-resistant, durable, and attractive.

According to one embodiment of the method of the present invention, a metallic core, a first plating bath, and a second plating bath are provided. The metallic core is electroplated using the first bath to result in a first layer adhered to and encasing the metallic core. The combination of the metallic core and the first layer are electroplated using the second bath to result in a second layer adhered to and encasing the first layer. The resulting first layer comprises copper or copper alloy. The resulting second layer comprises white bronze alloy.

In one embodiment, the first layer comprises from about 60% by weight of copper to about 100% by weight of copper. The second layer comprises from about 70% by weight of copper and about 30% by weight of tin to about 10% by weight of copper and about 90% by weight of tin. In one embodiment, the thickness of the first layer is from about 4 µm to about 18 µm, but may be as thick as 25 µm and beyond and still be within the scope of the invention. The thickness of the second layer, in one embodiment, is from about 4 µm to about 25 µm.

The method of the present invention may include additional steps to remove materials that may considered "contaminants" for the ensuing step. For example, prior to electroplating the first layer, the method of the present invention may include acid dips, "zincate" immersion deposit, or cleaning and rinsing to remove dirt or oil that may be present on the metallic core, or to remove other contaminants from the metallic core, or otherwise prepare the metallic core to receive an adherent electrodeposit. The method of the present invention may also include the step of rinsing or cleaning to remove any residue resulting from the first plating bath. The method of the present invention may further include, after the step of electroplating the second layer, the step of rinsing or cleaning to remove any residual second bath plating solution from the step of electroplating the second layer. As used in the claims, the term "contaminants" refers to any material (liquid or solid) that may be detrimental to the next step, and thus includes dirt, oil, and residues remaining from step(s) performed prior to the removal of the contaminants, as well as steps taken to prepare for receipt of an adherent electrodeposit in the next step(s).

The method of the present invention may also include the step of a "strike" prior to the step of electroplating the first layer onto the metallic core. Such striking scrubs the metal surfaces of the metallic core and usually applies a thin, protective layer of metal, such as copper or nickel, to ensure good adhesion of the first electroplated layer. Generally, this thin, protective layer is from about 0.1 µm to about 1.0 µm.

After the second layer is electroplated, post-plating steps may be taken to further ensure that the blank (the combination of the metallic core with the first and second layers adhered thereto) can be fashioned into the desired finished product using conventional techniques. This post-plating may include stress relief as is well known in the art. Further, the blanks may be burnished if a bright silvery-white finish is desired. Thus, the blanks of the present invention are suitable to be fashioned into coinage, tokens, and medallions having a silvery-white finish, such as usually accomplished with a nickel-based finish.

Another embodiment of the present invention comprises a metallic core and a single layer of white bronze. The layer of white bronze is electroplated from a plating bath comprising copper ions and tin ions. In this embodiment, no layer of copper or copper alloy is required.

The present invention produces a blank that does not contain any nickel on the outside surfaces thereof. Thus, the blank is suitable for production of coinage, tokens, and medallions that avoid subjecting consumers, users, cashiers, tellers, and those involved in the manufacturing process to contact with any nickel to which such persons may be allergic. A variety of sizes and types of metallic core materials may be used, and thicknesses of the metallic core, first layer, and second layer may be varied over a wide range to permit the present invention to produce new types of coinage, tokens, and medallions, as well as to produce coinage, tokens, and medallions intended to replace those that expose persons to nickel. The weight of coinage, tokens, and medallions of the present invention may also be controlled for acceptance by weight sensitive machines, such as vending machines and machines accepting subway tokens.

The method of the present invention does not involve many steps, and uses technology known in the art to manufacturers of blanks for coinage, tokens, and medallions. In addition, the materials and processes used to create such blanks are not expensive. Resulting coinage, tokens, and medallions can be made according to the present invention keeping the value of the metals in the coinage, tokens, and medallions below the value of the coinage, token, and medallion. Further, blanks made according to the present invention may be processed into finished product using conventional techniques, such as stamping in a die, and therefore does not require that mints or other manufacturers that make coinage, tokens, or medallions from such blanks change its processes or make any additional investment.

DETAILED DESCRIPTION

Figure 1:
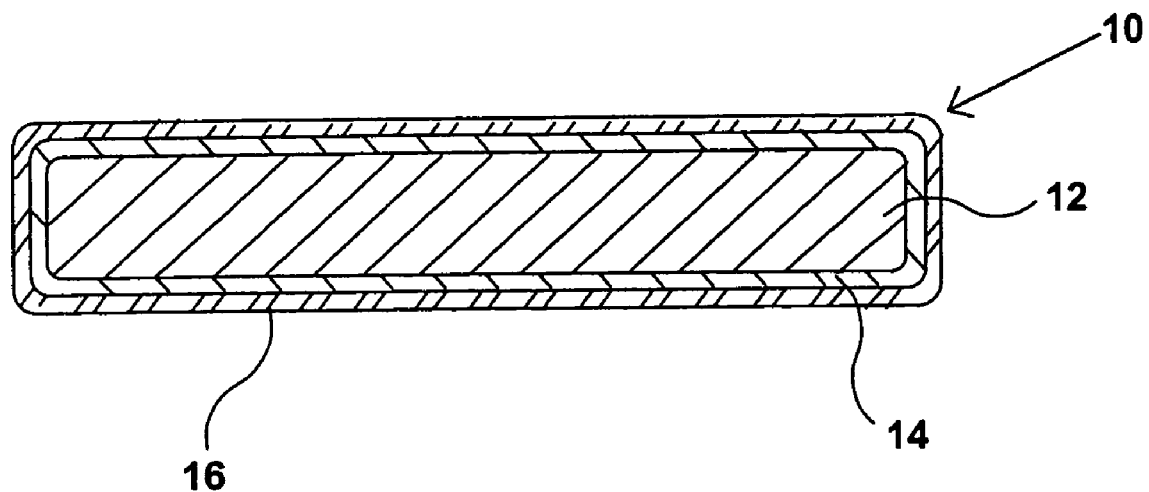
FIG. 1 shows a cross-sectional view of one embodiment of a coin blank of the present invention.
Figure 2:
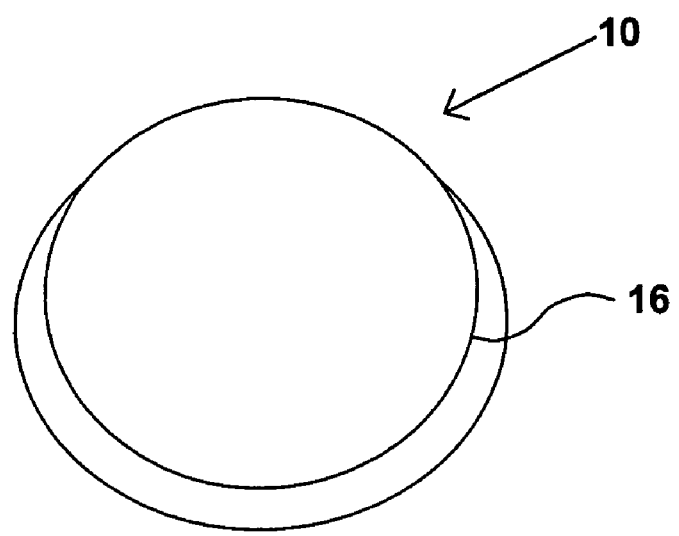
FIG. 2 shows a perspective view of the coin blank of the embodiment of FIG. 1.

Referring now to FIG. 1 and to FIG. 2, there is shown a cross-sectional view and perspective view, respectively, of one embodiment of a coin blank of the present invention. In this embodiment, coin blank 10 comprises core 12, first electroplated layer 14, and second electroplated layer 16. Core 12 comprises a metal or metal alloy to which copper and copper alloys may be electroplated, including but not limited to zinc, nickel, iron, copper, and aluminum, and any of their alloys, as well as any other metal or alloy that may be reasonably utilized in coinage, tokens, medallions, and the like. First electroplated layer 14 comprises copper or a copper alloy. First electroplated layer 14 is created, as disclosed herein, from a plating bath containing copper ions, and, in one embodiment, first electroplated layer 14 comprises from about 60% to about 100% by weight of copper. Second electroplated layer 16 comprises white bronze. The white bronze layer 16 is created from a bath that contains copper ions and tin ions, and, in one embodiment, white bronze layer 16 comprises from about 70% by weight of copper and about 30% by weight of tin to about 10% by weight of copper and about 90% by weight of tin.

It will be appreciated by those of skill of the art that a coin blank having the composition illustrated in association with FIG. 1 and FIG. 2 will have a silvery-white appearance. It will also be appreciated that coin blank 10 may also comprise a blank used to produce a token or medallion. Coin blank 10 is illustrated as a round plate, but coin blank 10 need not be round. Other shapes are contemplated to be within the scope of the invention, including but not limited to elliptical, triangular, rectangular, square, five or more sided, or an irregular shape. It will be further appreciated that core 12 of coin blank 10 is comprised of a non-precious metal, reasonable in cost, so as to not result in an item (coin, token, or medallion) having a value greater than the face value of the item.

Consider now one embodiment of a method for producing a coin, token, or medallion according to the present invention. Generally, the method of the present invention comprises the steps of producing/forming a metal blank (planchet) for the coin, token, or medallion, electroplating the planchet with a layer of copper, and then electroplating the copper layer with a layer of white bronze, an alloy of copper and tin. The blank plated with both the copper layer and the white bronze layer may then be "coined" into its final configuration (coin, token, medallion, or similar item) using a die or other methods well known in the art.

According to the present invention, the starting material, or substrate, comprises a metal planchet in the approximate shape and size of the coin, token, or medallion to be manufactured. In one embodiment, the metal planchet comprises a plate of thickness from about 500 µm to about 4,000 µm. A quantity of the planchets is then loaded into a plating barrel or onto a plating rack. The barrel or rack is then processed through a series of cleaners and rinses capable of removing any contaminants, such as dirt or oil, that may be present on the planchets. It will be appreciated that, depending upon the metal selected as the starting material, additional processing steps, such as acid dips or, in the case of aluminum, a "zincate" immersion deposit, may be required or desired to remove contaminants from the planchets (the cores) or otherwise prepare the planchets to receive an adherent electrodeposit.

After removal of contaminants from the planchets, then next step is a "strike," which scrubs the metal surfaces with hydrogen bubbles and simultaneously deposits a thin, protective layer (0.1-1.0 µm) of metal, usually copper, to ensure good adhesion of the first electroplated layer, as is discussed in further detail herein. Other metal strikes, predominantly nickel, may also be used in certain applications to ensure good adhesion to certain difficult-to-plate starting metals.

After the strike has been applied to the planchets, the barrel or rack is then moved into a copper plating bath. If an alkaline cyanide copper strike is used, the barrel or rack may be moved directly into an alkaline cyanide copper plating bath. However, if the contents of the strike and plating bath are chemically incompatible (e.g. cyanide copper strike followed by acid copper plating), thorough rinsing must take place before the planchets are moved into the copper plating bath.

Once in the copper plating bath, the planchets are electroplated until the desired plating thickness is reached, i.e., the first electroplated layer is of the desired thickness. Generally, such desired thickness will be from about 4 µm to about 18 µm. Greater thicknesses, for example up to 25 µm and beyond, are acceptable, provided that the combination of the starting metal planchets and the first electroplated layer does not result in units too large to fit into the die used for the desired production of the coinage, tokens, or medallions.

The first layer comprises copper or copper alloy. Examples of copper alloy include, but are not limited to yellow bronze or brass. An example of a yellow bronze first layer has from about 75% to about 99% by weight of copper and from about 25% to about 1% by weight of tin. An example of a brass first layer has from about 60% to about 99% by weight of copper, and from about 40% to about 1% by weight of zinc.

To create a first layer comprising copper or copper alloy, the first bath comprises copper ions. In one embodiment, the first plating bath may also comprise second metal ions or third metal ions. In addition, as is known in the art, the first plating bath may include complexing agents for the metal ions as well as other additives such as may be necessary to achieve satisfactory deposit of the metal ions. One example of a first plating bath comprises:

| Description of "Ingredient" | Molar Concentration |
| --- | --- |
| Copper Ions | 0.98 M |
| Cyanide ions to complex the copper ions | 2.94 M |
| "Free" cyanide ions to prevent anode polarization and "immersion" deposition of copper | 0.23 M |
| Hydroxyl ions to keep pH in proper range | 0.47 M |
| Tartrate ions to promote the dissolution of copper anodes | 0.16 M |

In using such first plating bath, to achieve a wide range of plating thicknesses, the plating conditions involve use of a barrel process, with a temperature of 120-180° F., and a current density of 3-10 amperes/ft$^2$.

After the copper plating cycle is complete, i.e., after the first electroplated layer is electroplated to the planchets, the barrel or rack is then moved through a series of rinses to remove any residual copper plating solution. The barrel or rack is then placed into a white bronze (speculum) plating bath. This white bronze plating bath deposits a binary alloy of copper and tin onto the first electroplated layer to form the second electroplated layer of white bronze. According to one embodiment of the present invention, the composition of the second layer of white bronze ranges from about 70% by weight of copper and about 30% by weight of tin to about 10% by weight of copper and about 90% by weight of tin.

The actual composition of the second electroplated layer is controlled by maintenance of the relative concentrations of copper, tin, cyanide, and hydroxide in the plating bath, as is well known in the art. Generally, copper and tin are supplied to the bath by anodic dissolution and/or chemical additions. Inert anodes and multiple rectifiers may be used, as is well known in the art, to ensure that the bath equilibrium is maintained.

Thus, to create the second layer comprising white bronze alloy, the second bath comprises copper ions and tin ions. In one embodiment, the second plating bath may also comprise metal ions in addition to copper and tin ions. In addition, as is known in the art, the second plating bath may include complexing agents for the metal ions as well as other additives such as may be necessary to achieve satisfactory deposit of the metal ions. One example of a second plating bath comprises:

| Description of "Ingredient" | Molar Concentration |
| --- | --- |
| Copper Ions | 0.22 M |
| Cyanide ions to complex the copper ions | 0.66 M |
| Tin Ion | 0.39 M |
| Hydroxyl ions to complex the tin ions | 2.34 M |
| "Free" cyanide and hydroxyl ions to maintain the desired plating composition | 0.31 M Cyanide 0.25 M Hydroxyl |
| Tartrate ions to promote the dissolution of copper anodes | 0.13 M |

Concentrations can vary over a wide range. Perhaps, the ratio of "free" cyanide ion to "free" hydroxide ions is the most important control parameter. In using such second plating bath, to achieve a wide range of plating thicknesses, the plating conditions involve use of a barrel process, with a temperature of 140-160° F., a current density of 3-10 amperes/ft$^2$, anodes of copper and carbon (independent rectifiers), and a tin source of potassium stannate.

It may be desired that the white bronze layer is deposited to a thickness less than or equal to that of the underlying copper deposit. However, the general limitation on the thickness of the starting metal, the first electroplated layer, and the second electroplated layer should be such that the coinage, token, or medallion can be "coined" into the final product with the appropriate thickness. Further, the thickness of the white bronze layer should probably be at least as great as 4 μm so that the second white bronze layer remains intact with normal wear and tear of the product.

When the present invention comprises a steel blank used for coinage, the general practice for steel blanks has been to have a total thickness of 25 μm for the layer or layers deposited on the core. Thus, for coinage applications, it may be desired that the total thickness of the first and second layers be 25 μm or greater. The upper limit on any layer or the combination of the first and second layers will also be affected by the desired thickness of the finished product.

After the white bronze plating cycle is complete, the barrel or rack is moved through a series of rinses to remove the residual plating solution, as is well known in the art. Also, as is well known in the art, anti-staining agents may be applied to the white bronze layer. The planchets having the first and second electroplated layers adhered thereto are then dried and collected for subsequent processing.

Depending upon the white bronze alloy plated and the nature of the substrate material, a post-plating stress relief process may be required or desired to ensure good "coinability", i.e., to ensure that the coated blank is able to be fashioned into the desired finished product. Usually, the blanks are burnished to produce a bright silvery-white finish; in some instances, the as-plated brightness may be sufficient. Finally, the blanks are "coined" into their finished appearance using conventional coining dies and presses as is well known in the art.

With white bronze plating, baking to relieve stresses is not required on a steel substrate. The burnishing process, if necessary, need not be as aggressive, because there are no oxides to be removed. If zinc is used as a starting material, the total plating thickness of the coinage, token, or medallion may be as low as about 8 μm, which greatly reduces the required plating time, and also extends significantly the coining die life. Regardless of the substrate metal, the white bronze finish provides a non-allergenic surface. This is especially important for people whose jobs require them to handle large quantities of coins.

Referring again to FIG. 1 and FIG. 2, according to another embodiment of the present invention, a coin blank may comprise only core 12 and second layer 16. First layer 14 may not be necessary or desired in all instances. At present, tin is generally more expensive than copper. Thus, present day economics may suggest the use of both a first plated layer of copper or copper alloy under a second layer of white bronze. However, the costs of manufacture of coinage, tokens, or medallions having two electroplated layers may be greater than coinage, tokens, or medallions having a single electroplated layer. Therefore, the total cost of materials and manufacture must be considered, as must the coinability of the coin blank, when considering whether to use a first layer of copper or copper alloy together with a second layer of white bronze, or just a layer of white bronze.

For example, when a zinc or zinc alloy metallic core is used, Applicant's experience has shown that a total plating thickness of 8 μm is sufficient for coinage, such as the U.S. penny. To achieve good coinability, a first layer of copper plating may be necessary if the "outer" plating layer is harder than copper. Thus, if a white bronze alloy harder than copper, such as white bronze comprising about 65% copper and about 35% tin, a first layer of copper plating of at least about 4 μm in thickness, followed by a second layer of white bronze of thickness less than or equal to the copper layer in thickness is desired. However, some white bronze alloys, such as a white bronze alloy comprising about 20% copper and about 80% tin, are softer than copper. When a white bronze alloy softer than copper is used, the first layer of copper or copper alloy is not required.

As another example, consider a blank comprising a steel metallic core. All white bronze alloys placed on a steel metallic core have good coinability, and, therefore, the first layer of copper or copper alloy is not required. Generally, when such a blank having a steel core is used for coinage, it is desired that the total plating thickness be at least about 25 μm for corrosion resistance. Thus, if only a white bronze layer is applied to the steel metallic core, it is desired that such white bronze layer be at least about 25 μm in thickness. As discussed above, with present day economics, it may be more effective to produce a coin having a first layer of copper or copper alloy of a thickness of from about 13 μm to about 18 μm together with a second layer of white bronze of about 8 μm to about 13 μm, than to produce a single layer of white bronze of at least 25 μm in thickness.

To make a blank comprising a metallic core and a single layer of white bronze, one embodiment of the method of the present invention comprises the steps of: (a) removing contaminants from metallic core; (b) "strike" the metallic core; (c) if the contents of the strike and the white bronze plating bath are incompatible, rinsing the metallic core; (d) electroplating a white bronze layer with a white bronze plating bath; and (e) rinsing the combination of the planchet covered with the layer of white bronze.

It will be appreciated by those of skill in the art that the present invention results in a new product—potentially totally nickel-free white coins, tokens, and medallions capable of withstanding the "coining" process on a variety of substrates. In particular, this enables the production of zinc-based coins with a corrosion and wear-resistant white finish. Zinc may be desired as a substrate material due to its prevalence and reasonable cost. Until the present invention, the only viable finishes for zinc-based coinage, tokens, or medallions were copper and yellow bronze. It is also possible to use nickel as the substrate, starting material, of the present invention. While coinage, tokens, or medallions of the present invention made with a nickel substrate are not nickel-free, handlers of such objects would not be exposed to the underlying nickel once covered by the first electroplated layer.

It will also be appreciated by those of skill in the art that the present invention permits for development of coinage, tokens, and medallions having the desired weight. The flexibility in weight results from the ability to use different substrate materials, and the flexibility in the thickness of the first and second electroplating layers.

It will be further appreciated that the coated blanks of the present invention may be "coined" using processes presently used to produce coinage, tokens, and medallions. The object may be fabricated into the finished product and has sufficient ductility to enable it to be struck or minted. Thus, no additional investment is required for manufacture in that regard. It will be yet further appreciated that the electroplating processes used to create the first and second electroplated layers are also industry standard, and therefore familiar to the manufacturer.

As used in the claims, the term "coin" refers to coinage, tokens, medallions, and other products typically comprised of metals and metal alloys onto the face of which one or more insignias, designs, and the like are formed by metal making processes on the outer layer of the metal or metal alloy.

The present invention can be further modified within the scope and spirit of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A coin, comprising:
   a metallic core having external surfaces;
   a first electroplated layer adhered to and encasing the external surfaces of the metallic core, the first electroplated layer of from about 4 μm to about 25 μm in thickness and comprising from about 60% by weight of copper to about 100% by weight of copper; and
   a second electroplated layer of white bronze adhered to and encasing the first electroplated layer, the second electroplated layer of from about 4 μm to about 25 μm in thickness and consisting of from about 70% by weight of copper and about 30% by weight of tin to about 10% by weight of copper and about 90% by weight of tin.

2. The coin of claim 1, wherein the metallic core comprises one of a group of zinc or zinc alloy.

3. The coin of claim 1, wherein the metallic core comprises one of a group of nickel or nickel alloy.

4. The coin of claim 1, wherein the metallic core comprises one of a group of iron or iron alloy.

5. The coin of claim 1, wherein the metallic core comprises one of a group of copper or copper alloy.

6. The coin of claim 1, wherein the metallic core comprises one of a group of aluminum or aluminum alloy.

7. The coin of claim 1, wherein the metallic core comprises a plate.

8. The coin of claim 7, wherein the plate thickness is from about 500 μm to about 4,000 μm.

* * * * *